Aug. 16, 1938.　　　　F. SCHMIDT　　　　2,126,705
ELASTIC COUPLING OF RUBBER-METAL PARTS
Filed Sept. 13, 1937
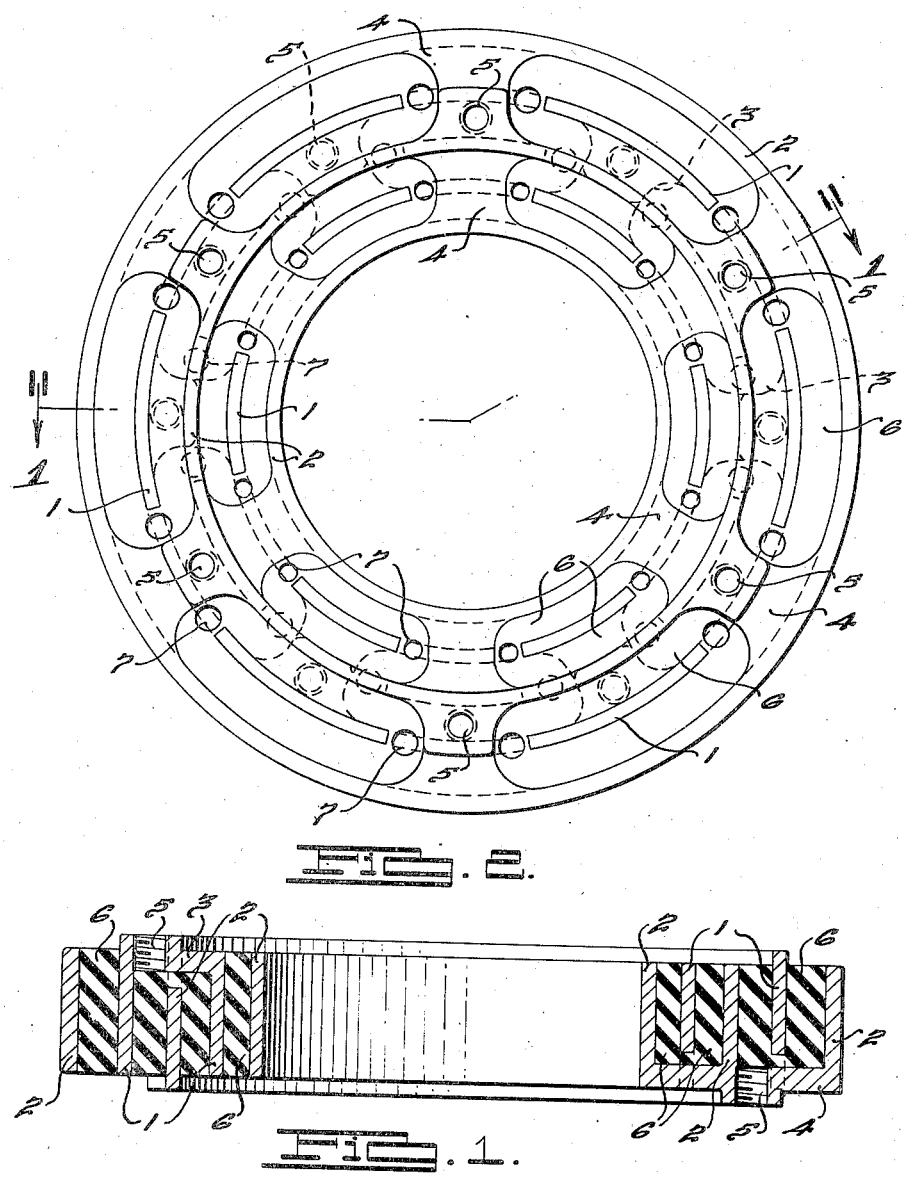
INVENTOR
Fritz Schmidt
BY Harness, Dickey & Pierce
ATTORNEYS.

Patented Aug. 16, 1938

2,126,705

UNITED STATES PATENT OFFICE 2,126,705

ELASTIC COUPLING OF RUBBER-METAL PARTS

Fritz Schmidt, Harburg-Wilhelmsburg, Germany, assignor to Metalastik Ltd., Leicester, England, a British firm Application September 13, 1937, Serial No. 163,636
In Germany November 18, 1935

5 Claims. (Cl. 64—11)

The invention relates to those couplings in which an elastic effect or action between the coupled parts is obtained by using rubber blocks and the like as intermediate layers. This results in the drawback that these loosely inserted parts, through their constant stressing as buffers, are flattened out after a short time, and thereby lose their elasticity as a result of the permanent stretching and hardening. By vulcanizing metal and rubber together, utilizability is increased, but it is however necessary to give the coupling a form that provides for the cooperation of the rubber and metal parts in a durable manner for the intended purpose. The present invention shows a coupling of this type, with which the rubber, which is used in an economical manner, is stressed in shear in the most favorable manner, and enables even large forces to be transmitted.

The drawing illustrates one form of construction of the invention. Fig. 1 shows a cross section along the line 1—1 of Fig. 2, and the latter figure shows a side view.

The metal structure or frame of the coupling consists of two annular members, one of which for example (as shown in the drawing) has two ring segments 1, and the other has three ring segments 2. The ring segments of the two groups 1 and 2, respectively, are connected together by spokes 3 and 4 respectively, whereby U-sections and double U-sections are formed at the spokes. The spokes 3 are disposed at one outer face of the coupling, and the spokes 4 at the other outer face, so that the segments 1 and 2 respectively alternate radially with one another. The outer edges of the segments 1 and the intermediate segment 2 respectively are cut out claw-wise in order to leave clearance for the spokes 3 and 4 during the elastic operation of the coupling. To the outer faces, which are formed chiefly by the spokes 3 and 4, there are connected the parts that are to be coupled, the ends of two shafts for example, by means of flanges or the like, and they may be made fast with screws by using the tapped holes 5. The spaces between the segments 1 and 2 are filled in with rubber 6, which is vulcanized to the segments.

The coupling's action in operation is formed by the displacement of the segments 1 relatively to the segments 2, and this displacement may occur both in the peripheral as well as in a radial direction. As a rule, relatively great yielding to torsion together with great resistance to radial oscillations will be a requirement. This case corresponds to the form of construction of the invention illustrated in the drawing, and the degree of hardness of the rubber, the strength of the individual rubber layers, the number of layers to be set parallel, and the area of the adhesion surfaces in the direction of rotation are determined accordingly. It follows, from the conditions shown in the drawing that radial oscillations find considerable resistance in the rubber, because the radial layer thickness of this rubber is small, and four layers work parallel, two stressed in compression and two in tension. On the other hand, for the oscillations in the direction of rotation that the coupling principally has to damp, shear stresses occur in the rubber, to which the rubber makes less resistance than to the other stresses. The segments present a large total adhesion surface, and consequently, in spite of small constructional dimensions, permit of the transmission of considerable forces, without reaching the point at which specific stresses in the rubber diminish its durability. The balancing of irregularities occurring in operation between the two coupling elements is effected by the displacement of the two segment groups 1 and 2 relatively to one another in the direction of rotation. In order to prevent any compression or tension stresses in these, the mass of rubber between the two outer faces (see Fig. 2), which is stressed in compression or tension, may be drilled out, or else during manufacture hollow spaces 7 may be formed by the insertion of suitable cores, it being understood that these openings are formed at each edge of the portions of segments 1 projecting between spokes 4 and at each edge of the portions of intermediate segment 2 projecting between spokes 3. It is advantageous here not to expose the metal of the surfaces movable relatively to one another, but to leave a thin layer of rubber over them, in order that during large displacements of the segments 1 and 2, no metallic contact may occur through which disturbing noises could be made.

What is claimed is:

1. An elastic coupling comprising annular, concentrically arranged segments arranged in radial, sequential relation, spokes at opposed axial sides of the segments, the spokes at one side connecting alternate segments and the spokes at the other side connecting the other segments alternate to the first segments, and rubber between the segments and vulcanized thereto.

2. An elastic coupling comprising annular, concentrically arranged segments arranged in radial, sequential relation, spokes at opposed axial sides of the segments, the spokes at one side connecting alternate segments and the spokes at the other side connecting the other segments alternate to the first segments, rubber between the segments and vulcanized thereto, and means on the spokes for connecting members to be coupled.

3. An elastic coupling comprising annular, concentrically arranged segments arranged in radial, sequential relation, spokes at opposed axial sides of the segments, the spokes at one side connecting alternate segments and the spokes at the other side connecting the other segments alternate to the first segments, and rubber between the segments and vulcanized thereto, the segments connected to the spokes at one side being cut out at circumferentially spaced points to provide clearance for the spokes at the opposite side.

4. An elastic coupling comprising annular, concentrically arranged segments arranged in radial, sequential relation, spokes at opposed axial sides of the segments, the spokes at one side connecting alternate segments and the spokes at the other side connecting the other segments alternate to the first segments, and rubber between the segments and vulcanized thereto, the segments connected to the spokes at one side being cut out at circumferentially spaced points to provide clearance for the spokes at the opposite side, and the rubber having recesses at circumferentially opposite sides of the latter spokes.

5. An elastic coupling comprising annular, concentrically arranged segments arranged in radial, sequential relation, spokes at opposed axial sides of the segments, the spokes at one side connecting alternate segments and the spokes at the other side connecting the other segments alternate to the first segments, and rubber between the segments and vulcanized thereto, the spokes at one side being arranged in circumferentially alternating relation to the spokes at the other side.

FRITZ SCHMIDT.